United States Patent
Yamamoto (10) Patent No.: US 8,782,205 B2
(45) Date of Patent: Jul. 15, 2014

(54) DEVICE AND COMPUTER READABLE MEDIUM

(75) Inventor: Hiroyuki Yamamoto, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 897 days.

(21) Appl. No.: 12/410,765

(22) Filed: Mar. 25, 2009

(65) Prior Publication Data

US 2009/0248862 A1 Oct. 1, 2009

(30) Foreign Application Priority Data

Mar. 26, 2008 (JP) .................................. 2008-079939

(51) Int. Cl.
  *G06F 15/173* (2006.01)
  *H04L 29/06* (2006.01)
  *H04L 12/56* (2006.01)

(52) U.S. Cl.
  CPC ......... *H04L 63/102* (2013.01); *H04L 2463/101* (2013.01); *H04L 47/20* (2013.01); *H04L 63/101* (2013.01)
  USPC ............................. 709/224; 709/225; 709/226

(58) Field of Classification Search
  CPC . H04L 63/102; H04L 2463/101; H04L 47/20; H04L 63/101; H04L 63/104; H04L 63/20
  USPC .......................................... 709/224, 225, 226
  See application file for complete search history.

(56) References Cited

U.S. PATENT DOCUMENTS

| | | | |
|---|---|---|---|
| 7,755,792 B2* | 7/2010 | Sakayama et al. | 358/1.15 |
| 7,953,025 B2* | 5/2011 | Wigren | 370/252 |
| 7,983,187 B2* | 7/2011 | Wigren | 370/252 |
| 2002/0107810 A1* | 8/2002 | Nishio et al. | 705/59 |
| 2002/0140963 A1* | 10/2002 | Otsuka | 358/1.14 |
| 2002/0151320 A1* | 10/2002 | Wasenius | 455/518 |
| 2004/0127277 A1* | 7/2004 | Walker et al. | 463/16 |
| 2006/0121908 A1* | 6/2006 | Kikinis | 455/447 |
| 2006/0190562 A1* | 8/2006 | Ohno | 709/218 |
| 2006/0271781 A1* | 11/2006 | Murakawa | 713/168 |
| 2007/0004386 A1* | 1/2007 | Singh et al. | 455/414.1 |
| 2007/0097415 A1* | 5/2007 | Okamoto | 358/1.14 |
| 2007/0171466 A1* | 7/2007 | Shigeeda | 358/1.15 |
| 2007/0208863 A1* | 9/2007 | Otsuka et al. | 709/227 |
| 2007/0293319 A1* | 12/2007 | Stamper et al. | 463/42 |
| 2008/0081643 A1* | 4/2008 | Nagata et al. | 455/456.6 |

(Continued)

FOREIGN PATENT DOCUMENTS

| | | |
|---|---|---|
| JP | 8-025757 A | 1/1996 |
| JP | 11-249846 | 9/1999 |

(Continued)

OTHER PUBLICATIONS

JP Office Action dtd Jan. 26, 2010, JP Appln. 2008-079939, partial English translation.

*Primary Examiner* — Karen Tang
(74) *Attorney, Agent, or Firm* — Banner & Witcoff, Ltd.

(57) ABSTRACT

A device and a computer readable medium having a computer program stored thereon are provided. The device includes: a detecting unit configured to detect one or more host computers accessible from the device and operational states of the respective host computers; and a restricting unit configured to restrict a function of the device based on the operational states of the host computers detected by the detecting unit.

12 Claims, 7 Drawing Sheets

(56) References Cited

U.S. PATENT DOCUMENTS

| | | | |
|---|---|---|---|
| 2008/0101243 A1* | 5/2008 | Fukui et al. | 370/238 |
| 2009/0006519 A1* | 1/2009 | Nandan et al. | 709/200 |
| 2009/0138965 A1* | 5/2009 | Ferlitsch | 726/21 |
| 2010/0315947 A1* | 12/2010 | Wigren | 370/230 |
| 2011/0061113 A1* | 3/2011 | Rubinstein et al. | 726/34 |
| 2011/0065417 A1* | 3/2011 | McDonald et al. | 455/410 |
| 2011/0090525 A1* | 4/2011 | Chen | 358/1.13 |

FOREIGN PATENT DOCUMENTS

| | | |
|---|---|---|
| JP | 2001-199131 | 7/2001 |
| JP | 2001-216119 A | 8/2001 |
| JP | 2002-347308 A | 12/2002 |
| JP | 2006-332807 A | 12/2006 |

* cited by examiner

DEVICE AND COMPUTER READABLE MEDIUM

CROSS-REFERENCE TO RELATED APPLICATIONS

This application is based upon and claims priority from Japanese Patent Application No. 2008-079939 filed on Mar. 26, 2008, the entire contents of which are incorporated herein by reference.

TECHNICAL FIELD

The present invention relates to a device and a computer readable medium having a computer program stored thereon, the device and the program being capable of executing a function restriction based on states of host computers.

BACKGROUND

A multi function image forming apparatus are used by many users. In order to enhance security or prevent unauthorized use of a multi function image forming apparatus, a function restriction for the multi function image forming apparatus has been performed by an administrator. However, the administrator is required to spend a large amount of labor for the administration of the function restriction, which is an inefficient administration method.

JP-A-11-249846 describes a technique in which the function restriction for a multi function image forming apparatus is managed based on a time period.

SUMMARY

However, because the function restriction for the multi function image forming apparatus is managed based on a time period, even when there are a small number of users who can use the multi function image forming apparatus, which is easy to conduct unauthorized use, the function restriction is canceled. Further, even when there are many users who can use the multi function image forming apparatus, which may be allowed to be lax on security, the function restriction is executed.

That is, in the method in which the function restriction is managed based on a time period, the function restriction is managed regardless of the situation of users who can use the multi function image forming apparatus.

The present invention was made in consideration of the above-described circumstances, and an object thereof is to provide a function restriction for a device based on operational states of host computers connected to the device.

According to an aspect of the invention, there is provided a device comprising: a detecting unit configured to detect one or more host computers accessible from the device and operational states of the respective host computers; and a restricting unit configured to restrict a function of the device based on the operational states of the host computers detected by the detecting unit.

According to another aspect of the invention, there is provided a computer readable medium having a computer program stored thereon and readably by the computer, said computer program, when executed by the computer, causes the computer of a device to perform operations comprising: detecting one or more host computers accessible from the device and operational states of the respective host computers; and restricting a function of the device based on the operational states of the host computers detected by the detecting unit.

DESCRIPTION

Hereinafter, exemplary embodiments of a multi function device serving as a device of the present invention will be described in detail.

<General Configuration>

Figure 1:
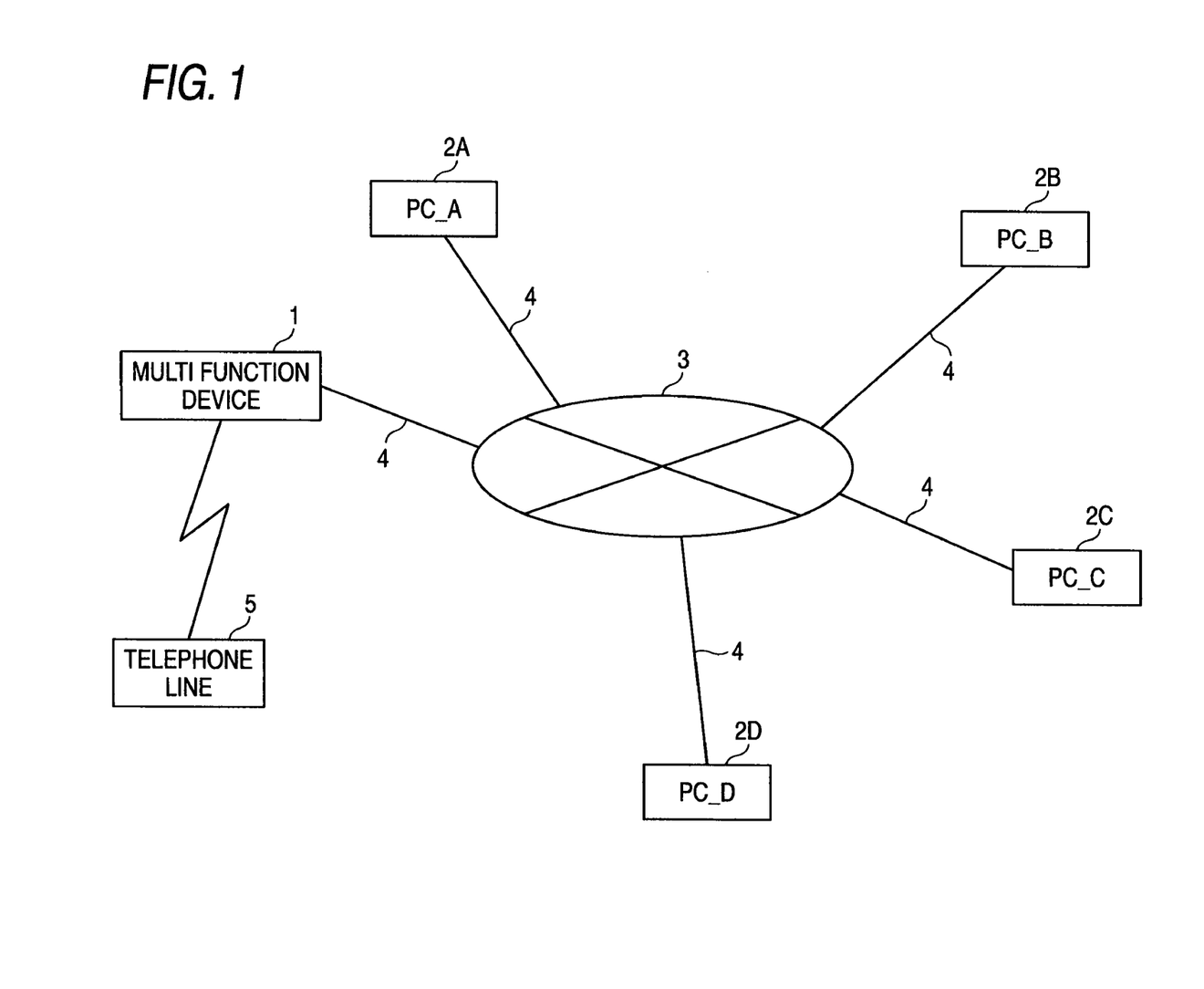
FIG. 1 is a diagram showing a connection configuration of a multi function device and PCs.

FIG. 1 is a diagram showing a connection configuration of a multi function device 1 serving as an example of a device with personal computers (PCs) 2, especially, a PC_A 2A, a PC_B 2B, a PC_C 2C, and a PC_D 2D serving as an example of host computers.

The PC_A, PC_B, PC_C and PC_D are denoted by reference symbols 2A, 2B, 2C and 2D which include the additional characters "A," "B," "C," and "D" for distinguishing the respective PCs. When there is no need to especially distinguish the PCs, they are simply described with PC(s) 2. Further, the PC_A to PC_D serve as names of PCIDs (personal computer identifications) for identifying the respective PCs 2 as well. The PC_A 2A to PC_D 2D and the multi function device 1 constitute a printing system.

The multi function device 1 can perform various functions such as a print function, a scanner function, a copy function, a FAX communication function, and an E-MAIL communication function. The respective functions may be used via an operation unit 15 and a display unit 16 on the multi function device 1, or may be used by commands from the PCs 2. The multi function device 1 includes a network interface (I/F) 20 connected to a network 3 via a LAN cable 4 such that the multi function device 1 is connected to the respective PCs 2. The network I/F 20 is an example of a network connection unit. Further, the multi function device 1 is connected to a telephone line 5 via a modem 19 to enable the FAX function.

The PCs 2 are computers to be ordinarily used, and each of the PCs 2 transmits various commands to the multi function device 1 so as to remotely operate the various functions of the multi function device 1. Each of the PCs 2 includes a network I/F 27 similar the multi function device 1, which is connected to the network 3 and the LAN cable 4. Accordingly, the multi function device 1 and the respective PCs 2 are connected via the network 3.

In this exemplary embodiment, the number of PCs 2 is four, the multi function device 1 and the PCs 2 are connected via the network 3. However, the present invention is not limited thereto. That it, the number of PCs 2 may be two or more. Further, the multi function device 1 and the PCs 2 may be connected with various connection methods such as USB I/Fs and printer port I/Fs by using a HUB, or may be connected via wireless communication system such as a wireless Local Area Network (LAN) and infrared communication.

When the multi function device 1 communicates with the PCs 2 via the network 3 or the PCs 2 communicate with one another, the communication protocol used in the communication is TCP/IP. That is, the communication between the multi function device 1 and each PC 2 or the communication among the respective PCs 2 is performed such that one piece of data is divided into small packets, and the packets to which header information is added are transmitted separately several times. The packet communication enables efficient use of the network 3.

<Hardware Configuration>

Figure 2:
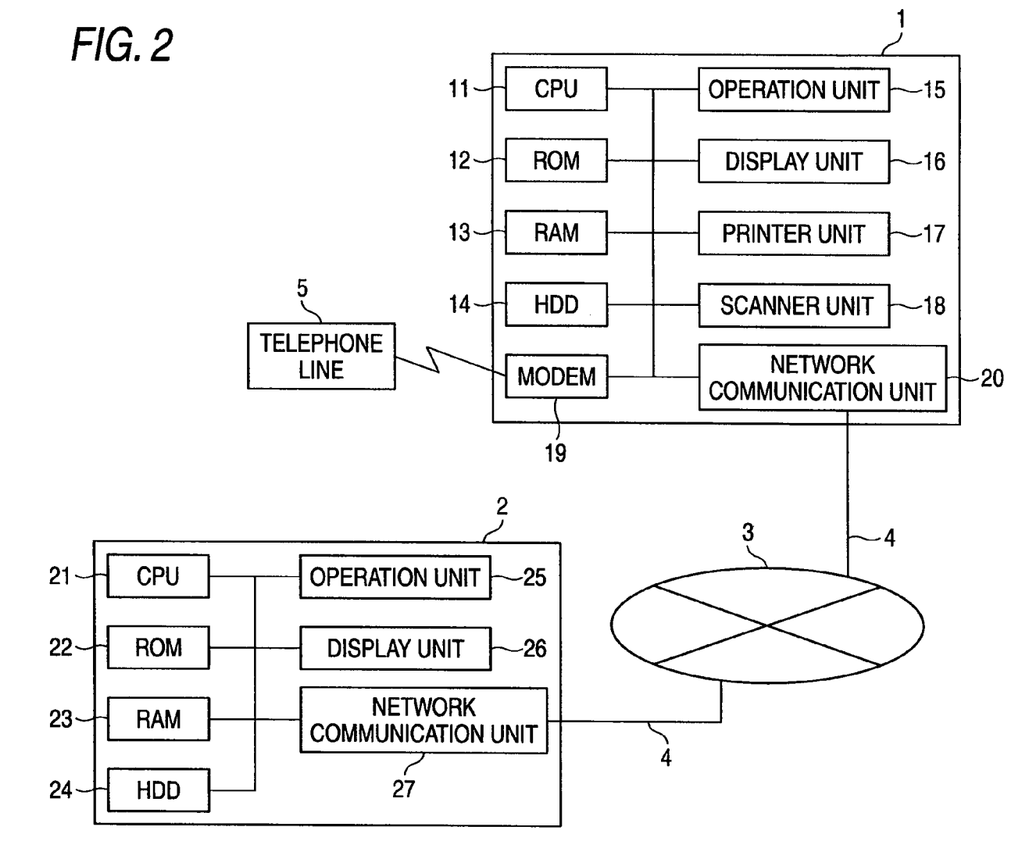
FIG. 2 is a block diagram showing a hardware configuration of the multi function device and the PC.

FIG. 2 is a block diagram showing a hardware configuration of the multi function device 1 and the PC 2.

The multi function device 1 includes therein: a Central Processing Unit (CPU) 11 that executes various processing; a Read Only Memory (ROM) 12 storing a program for a startup processing, etc., executed by the CPU 11; and a Random Access Memory (RAM) 13 used as a storage area when the CPU 11 executes various processing. In addition, the CPU 11 implements operations of a detecting unit, a restricting unit, a first extraction unit, a second extraction unit, an information detecting unit, and a determination unit.

The RAM 13 includes a user ID management area that stores user IDs as examples of user information to manage the number of users N in this area. The user ID management area is to be in a writable storage area such as a Hard Disk Drive (HDD) 14.

The multi function device 1 further includes the HDD 14, the operation unit 15, the display unit 16, a printer unit 17, a scanner unit 18, the modem 19, and the network I/F 20.

The HDD 14 stores a telephone book in which destination information used for the FAX communication function can be registered, and an address book in which E-MAIL addresses used for the E-MAIL communication function can be registered.

The operation unit 15 includes push buttons or a touch panel, etc. When a user operates the operation unit 15, the functions of the multi function device 1 can be executed without any command from the PCs 2.

The display unit 16 includes an LCD, etc., which indicates various information such as operation information by the operation unit 15, function information, and error information to the user.

The printer unit 17 prints print data on a sheet, and is used when the print function, the copy function, and the printing in response to a reception in the FAX communication function are executed.

The scanner unit 18 optically reads a print state of a printed sheet, and is used when the scanner function, the copy function, and transmission of the FAX communication function are executed.

The modem 19 is a connection unit configured to connect the multi function device 1 and the telephone line 5, and is used when the FAX communication function is executed.

The network I/F 20 is a connection unit configured to connect the multi function device 1 and the network 3 via the LAN cable 4.

The PC 2 includes a CPU 21, a ROM 22, a RAM 23, an HDD 24, an operation unit 25, a display unit 26, and the network I/F 27.

The CPU 21 is a processing executing unit, and executes the processing for programs stored in the ROM 22 and the HDD 24 serving as storage areas. The RAM 23 serving as a temporary storage area is an area for executing the processing for the programs.

The ROM 22 mainly stores a basic program (a Basic Input/Output System (BIOS) or the like) of the PC 2 therein, and the HDD 24 stores an operating system (OS), etc., configured on the basic program.

The operation unit 25 includes a mouse, a keyboard, etc., and is used to allow a user to operate the PC 2. The display unit 26 includes a CRT, an LCD, etc., and informs a user of various pieces of information.

The network I/F 27 is a connection unit configured to connect the PC 2 and the network 3 via the LAN cable 4.

The HDD 24 stores a user ID therein. A plurality of user IDs are stored in the HDD 24, and one user ID is selected from the plurality of user IDs by a user when the PC 2 is started up or an OS in the PC 2 is launched, which makes the PC 2 ready for use.

Hereinafter, "a process to allow the PC 2 to be ready for use with a user ID" is referred to as a "logon." Further, "a process to switch the PC 2 from a state ready for use to an unusable state (e.g., a process in which the power of the PC is turned off, a process in which the OS is shut down, or the like)" is referred to as a "logoff." Still further, the state of the PC 2 from the logon to the logoff, i.e., the PC 2 is ready for use, is referred to as a "logon state."

Each user ID is associated with a password corresponding thereto, and each user manages the password to administer a use of the user ID, which allows only a specific user to use its user ID. Therefore, it can be determined who is using the PC 2 in use.

The HDD 24 in the PC 2 may have one unique user ID stored thereon. In this case, a user can log on to the PC 2 without selecting a user ID. In other words, the logon to the PC2 is restricted to a specific user authorized to use the unique user ID. Therefore, when the PC 2 is made ready for use, it is possible to evidently determine who is using the PC 2.

In this exemplary embodiment, it is assumed that four user IDs of User_1, User_2, User_3, and User_4 are registered with each of the PCs 2. In order to use each of the PCs 2, it is necessary to log on to the PC 2 with one user ID selected from the four user IDs.

<Function Restriction>

The multi function device 1 can perform a functional restriction. The function restriction is for restricting the functions of the multi function device 1 for the purpose of enhancing security or preventing unauthorized use.

When the function restriction is enabled, one or more functions selected from functions of the multi function device 1 are not available. For example, when the multi function device 1 has functions such as the print function, the scanner function, the copy function, the FAX communication function, and the E-MAIL communication function, enabling the function restriction makes the scanning function and the copy function be unavailable.

As another example of the function restriction, a transmission method in the FAX communication function is restricted. For example, there are two transmission methods: selecting a destination from a telephone book; and inputting a telephone number of the telephone number of the destination. In this case, the function restriction may make inputting the telephone number unavailable such that the destinations are restricted to those registered in advance with the telephone book in the HDD 14.

The function restriction may be carried out by a restriction for each user ID, or for each of the PCs 2 in use. Further, the function restriction may restrict a reception of commands from the PCs 2 for using the various functions and allow a reception of operations from the operation unit 15 and the display unit 16 of the multi function device 1, or vice versa.

When the function restriction is enabled, it may be cancelled by using a password. Further, it may be possible for only an administrator to cancel the function restriction.

In this exemplary embodiment, a method for putting restrictions on the functions may be in any mode, as long as the multi function device 1 is a device capable of putting any restriction on the functions.

<Processing for Enabling or Disabling Function Restriction>

Figure 3:
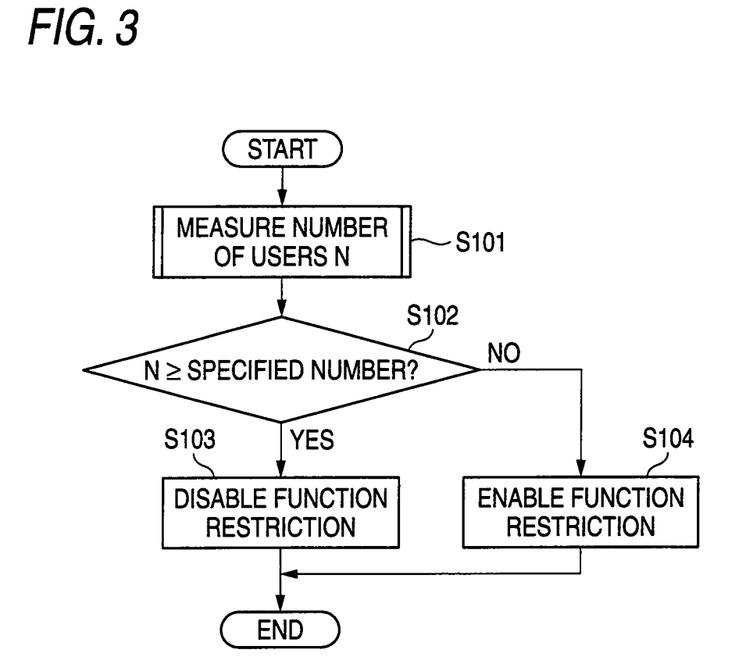
FIG. 3 is a flowchart showing processing for enabling or disabling the function restriction based on the number of users.

FIG. 3 is a flowchart showing processing for enabling or disabling the function restriction based on the number of users N. The processing is executed by the CPU 11 of the multi function device 1. Hereinafter, the processing for enabling or disabling the function restriction will be described with reference to FIG. 3.

When the processing for enabling or disabling the function restriction starts, at step 101 (hereinafter, abbreviated to "S101"), the CPU 11 of the multi function device 1 measures the number of users N accessible to the multi function device 1 based on the information on the user IDs in the PCs 2 connected to the multi function device 1 via the network 3. The users accessible to the multi function device 1 means users of the PCs 2 in the logon status. At S101, the CPU 11 measures the number of user IDs obtained from the PCs 2 in the logon status as the number of users N accessible to the multi function device 1.

Next, at S102, it is determined whether the number of users N is a threshold number or more. The exemplary embodiment will be described assuming that the threshold number is specified to 2. If the number of users N is 2 or more (S102: YES), the function restriction is disabled at S103. If the number of users N is less than 2 (S102: NO), the function restriction is enabled at S104. Because the total number of PCs 2 may be increased or decreased in some cases, a specified number is preferably possible to be appropriately set by a user.

S101 is an example of an operation executed by the detecting unit, and S104 is an example of an operation executed the restricting unit.

By the control as described above, the function restriction for the common multi function device 1 used by a plurality of users, for example, in an office, etc., can be managed with the number of users N.

The processing for enabling or disabling the function restriction is executed every time the number of users N is measured. The measurement of the number of users N may be executed periodically at certain intervals, or may be executed under a certain condition. The measurement of the number of users N will be described in detail later.

<First Processing for Measuring Number of Users N>

Figure 4:
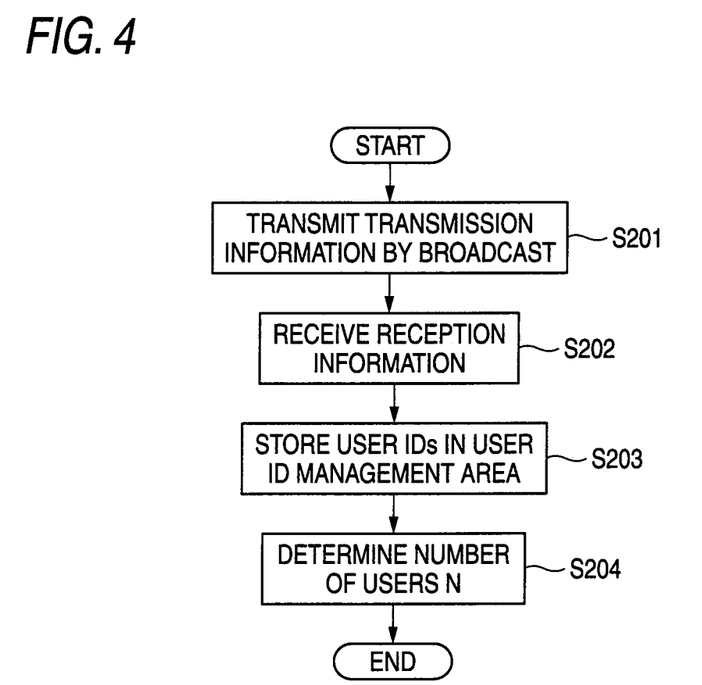
FIG. 4 is a flowchart showing the processing for measuring the number of users by performing transmission and reception of information using broadcast by the multi function device.
Figure 5:
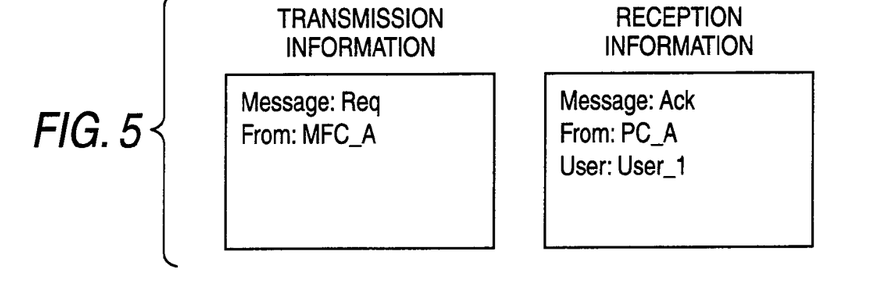
FIG. 5 is a diagram showing an example of transmission information from the multi function device and reception information to the multi function device.
Figure 6:
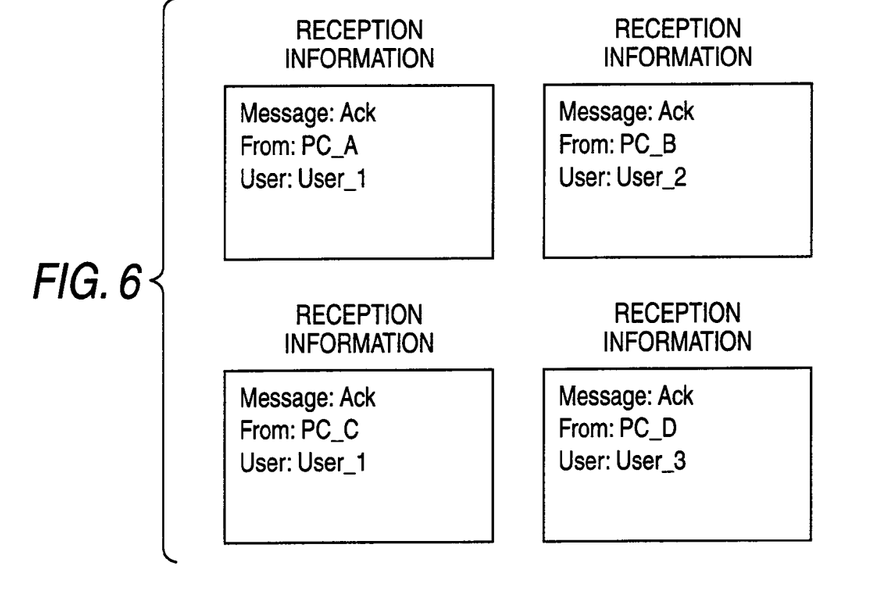
FIG. 6 is a diagram showing an example of reception information in a first processing for measuring the number of users.
Figure 7:
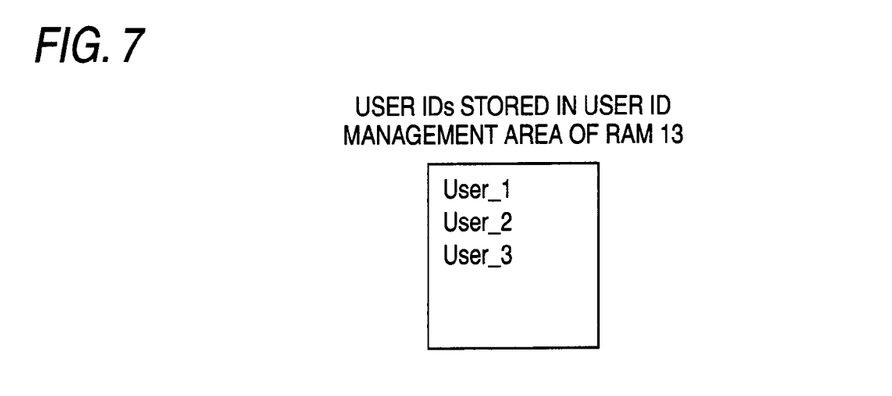
FIG. 7 is a diagram showing an example in which user IDs are stored in the user ID management domain.

FIG. 4 shows an example of processing for measuring the number of users at S101 in the flowchart shown in FIG. 3 as a first processing for measuring the number of users N. FIG. 4 is a flowchart showing the processing for measuring the number of users N by performing transmission and reception of information using broadcast by the multi function device 1. FIG. 5 is a diagram showing an example of transmission information from the multi function device 1 and reception information to the multi function device 1. FIG. 6 is a diagram showing an example of reception information. FIG. 7 is a diagram showing an example in which user IDs are stored in the user ID management area. Hereinafter, the first method for measuring the number of users N will be described with reference to FIG. 4 to FIG. 7.

When the processing for measuring the number of users N is started, at S201, the CPU 11 of the multi function device 1 transmits the transmission information shown in FIG. 5 to the PCs 2 by broadcasting from the multi function device 1 via the network 3 respectively. In the transmission shown in FIG. 5, "Message: Req" is information to request the PCs 2 to send a response, and "MFC_A" of "From: MFC_A" is an MFCID of the multi function device 1. Here, MFCID is unique identification information assigned to the multi function device 1. That is, transmitting the transmission information in FIG. 5 means that information requesting a response of each of the PCs 2 is transmitted from the multi function device 1 having the MFCID of an MFC_A. The transmission information is an example of a request command.

Next, at S202, the CPU 11 of the multi function device 1 receives the reception information shown in FIG. 5 from each of the PCs 2. In the reception information shown in FIG. 5, "Message: Ack" is response information to "Message: Req" in the transmission information, "From: PC_A" is a PCID of the PC_A 2A, and "User: User_1" is a user ID. The PCID is unique identification information assigned to the PC 2. That is, receiving the reception information in FIG. 5 means that the response information that the User_1 is using the PC_A 2A, is received at the multi function device 1 from the PC_A 2A.

Since each of the PCs 2 receives one PCID and one user ID on receiving the reception information, the multi function device 1 does not receive information on the respective PCs 2 redundantly in any case.

Next, at S203, user IDs in the received reception information are stored in the user ID management area in the RAM 13 of the multi function device 1.

Next, at S204, the number of users N is determined based on the number of user IDs stored in the user ID management area in the RAM 13 at S203.

Here, an example of the processing method from S202 to S204 will be described with reference to FIG. 6 and FIG. 7. FIG. 6 is the reception information on the PC_A 2A to the PC_D 2D received at S202. The user IDs of the PC_A 2A and the PC_C 2C are User_1. That is, the User_1 is using the two PCs 2 of the PC_A 2A and the PC_C 2C. In this case, because redundant user IDs are not stored at S203, only one User_1 is stored in the user ID management area as shown in FIG. 7. Therefore, the number of users N is determined to be 3 at S204.

As described above, the measurement of the number of users N is completed. In the processing, S202 is an example of an operation executed by the information detecting unit, and S204 is an example of an operation executed by the first extraction unit.

The processing for enabling or disabling the function restriction to which the first processing for measuring the number of users N is applied may be executed periodically at certain intervals, or may be executed every time the multi function device 1 is started up. Further, a command to perform the processing for enabling or disabling the function restriction may be issued by the user from one of the PCs 2 or the multi function device 1, or may be issued by the administrator only. In this processing, S201 is an example of operations of a transmitting unit, and S202 is an example of operations of a receiving unit.

<Second Processing for Measuring Number of Users N>

Figure 8:
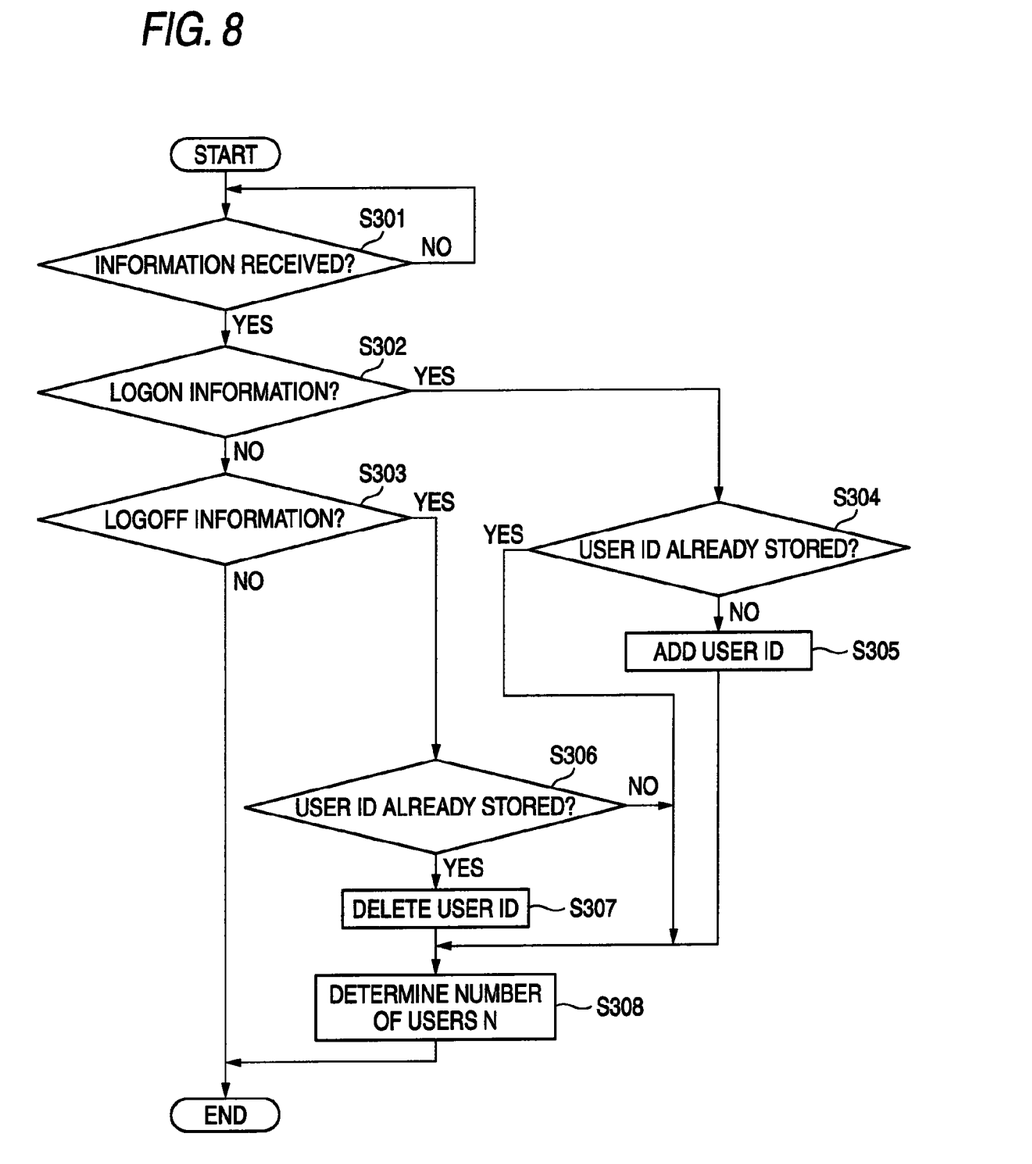
FIG. 8 is a flowchart showing the processing for measuring the number of users N by receiving logon information and logoff information of the PCs at the multi function device.
Figure 9:
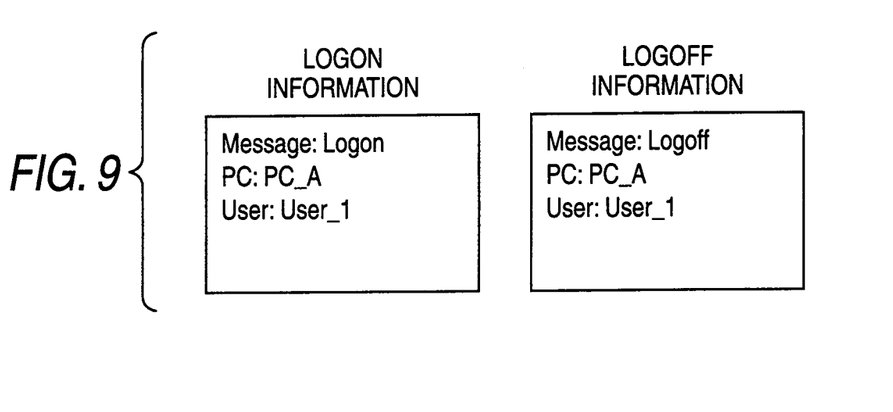
FIG. 9 is a diagram showing an example of reception information in a second processing for measuring the number of users.

FIG. 8 shows an example of processing for measuring the number of users at S101 in the flowchart shown in FIG. 3 as a second processing for measuring the number of users N. FIG. 8 is a flowchart showing the processing for measuring the number of users N by receiving logon information and logoff information of the PCs 2 at the multi function device 1. FIG. 9 is a diagram showing an example of reception information. Hereinafter, the second method for measuring the number of users N will be described with reference to FIG. 7 to FIG. 9.

In the case of the second processing for measuring the number of users N, the PCs 2 transmits logon information or logoff information to the multi function device 1 via the network 3, in response to the logon or the logoff of the respective PCs2. Specifically, each of the PC 2 may transmit the logon information at or after the logon thereof. Further, each of the PC 2 may transmit the logon information when or after a reception of a logoff instruction or during a process of the logoff. The multi function device 1 analyzes logon information or logoff information to execute measurement of the number of users N. The logon information and the logoff information is an example of event information indicating an action of the PC 2.

When the processing for measuring the number of users N is started, the processing is repeated at S301 until the CPU 11 of the multi function device 1 receives information from the PCs 2. In addition, the processing at S301 is infinitely repeated in a task separate from a usual operation processing of the multi function device 1 when the multi function device 1 is active. Therefore, measurement of the number of users N is started due to the multi function device 1 being started up.

If it is determined that the information is received at S301 (S301: YES), it is determined whether the information is reception information at S302 and S303. The reception information is the logon information or the logoff information shown in FIG. 9. "Message: Logon" in the logon information is information indicating that a user logs on to one of the PCs 2, and "Message: Logoff" in the logoff information is information indicating that a user logs off of one of the PCs 2. "PC: PC_A" and "User: User_1" respectively indicate a PCID and a user ID in the same way as in FIG. 5 and FIG. 6.

If it is determined that the information received at S301 is not the reception information (S302: NO and S303: NO), the information is handled as another information unrelated to the processing for measuring the number of users N. Description thereof will be omitted. On the other hand, if it is determined that the information received at S301 is the reception information (S302: YES or S303: YES), the CPU 11 proceeds to each processing. The CPU 11 proceeds to the following processing of the processing for measuring the number of users N.

First, the case in which the reception information is the logon information (Message: Logon) (S302: YES) will be described.

At S304, the CPU 11 obtains a user ID from the received logon information, and determines whether the user ID is stored in the user ID management area in the RAM 13 of the multi function device 1. Here, if the user ID is not stored in the user ID management area (S304: NO), a user ID is added to the user ID management area at S305.

On the other hand, at S304, if the user ID is in the user ID management area (S304: YES), the processing at S305 is not executed.

The processing at S304 and S305 will be described with reference to FIG. 7. It is assumed that the user ID stored in the user ID management area is in the state shown in FIG. 7 before the processing at S304 is executed. Here, when the user ID in the logon information is User_2, it is determined that the user ID is stored in the user ID management area (S304: YES), and a user ID is not added. This state means that the User_2 logs on to a new one of the PCs 2 such that the User_2 uses a plurality of PCs 2.

Further, when the user ID in the logon information is User_4, it is determined that the user ID is not stored in the user ID management area at S304 (S304: NO), and a user ID is added at S305. This state means that the User_4 who is a new user newly logs on to the PC 2.

Next, the case in which the reception information is the logoff information (Message: Logoff) (S303: YES) will be described.

At S306, the CPU 11 obtains a user ID from the received logoff information, and determines whether the user ID is stored in the user ID management area in the RAM 13 of the multi function device 1. If the user ID is stored in the user ID management area (S306: YES), the user ID in the user ID management area is deleted at S307.

On the other hand, at S306, if the user ID is not stored in the user ID management area (S306: NO), the processing at S307 is not executed.

The processing at S306 and S307 will be described with reference to FIG. 7. It is assumed that the user ID stored in the user ID management area is in the state shown in FIG. 7 before the processing at S306 is executed. Here, when the user ID contained in the logoff information is User_3, it is determined that the user ID is stored in the user ID management area (S306: YES), and the user ID is deleted at S307. This state means that the User_3 logs off.

Further, when the user ID in the logoff information is User_4, it is determined that the user ID is not stored in the user ID management area at S306 (S306: NO), and the user ID is not deleted. This state means that the multi function device 1 is started up after the startup of the PC 2 in use by the User_4, which is caused because User_4 is not stored in the user ID management area.

After the processings processing at 304 to S307 are completed, at S308, the number of users N is determined based on the number of user IDs stored in the user ID management area in the RAM 13 in the same way as the processing at S204 in the first processing for measuring the number of users N.

As described above, the measurement of the number of users N is completed. In this processing, S301 to S303 are an example of operations executed by the information detecting unit, and S308 is an example of an operation executed by the first extraction unit.

In addition, in the case of the second processing for measuring the number of users N, a user ID is not stored in the user management area when the startup of the multi function device 1 is after the startup of the PC 2. Therefore, the accurately of the measurement of the number of users N in this way is reduced. Accordingly, the first processing for measuring the number of users N is executed when the multi function device 1 is started up, to grasp the active state of the PC 2 immediately after the multi function device 1 is started up, which further enhances the convenience.

<Third Processing for Measuring Number of Users N>

Figure 10:
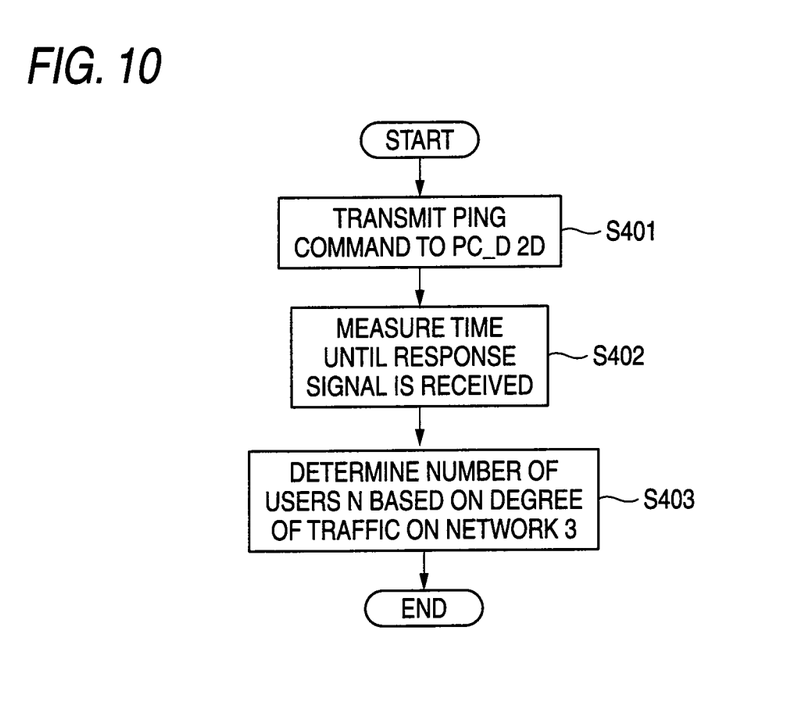
FIG. 10 is a flowchart showing the processing for measuring the number of users N based on the traffic on the network.

FIG. 10 shows an example of processing for measuring the number of users at S101 in the flowchart shown in FIG. 3 as a third processing for measuring the number of users N. FIG. 10 is a flowchart showing the processing for measuring the number of users N based on a degree of traffic on the network 3. Hereinafter, the third processing for measuring the number of users N will be described with reference to FIG. 10. In addition, the third processing for measuring the number of users N requires a PC 2 that is always active at least during execution of the third processing. This exemplary embodiment will be described on the assumption that the PC_D 2D is always active.

When the processing for measuring the number of users N is started, the CPU 11 of the multi function device 1 transmits a ping command to the PC_D 2D via the network 3. The ping command is a command to request a response to a destination, and the PC_D 2D that receives the ping command from the multi function device 1 transmits a response signal to the multi function device 1.

Next, at S402, the multi function device 1 measures a time until a response signal is received after a ping command is transmitted to the PC_D 2D. The shorter the time is, the lower the degree of traffic on the network 3 is, and the longer the time is, the higher the degree of traffic on the network 3 is. At least, when the degree of traffic on the network 3 is low, it may be determined that the number of users N using the network 3 is small. Therefore, at S403, the number of users N (in particular, a small number of users) can be determined based on the degree of traffic on the network 3.

In this processing, S402 is an example of an operation executed by the determining unit, and S403 is an example of an operation executed by the third extraction unit.

The third processing for measuring the number of users N is not limited to the above-described method. For example, the number of packets and a data amount on the network 3 may be measured for a given time, to measure the degree of traffic on the network 3. In this case, the measurement uses a reference value for the number of packets and/or a data amount used per one user for the given time period. The reference value may be predetermined or may be determined based on performance of the network 3 (such as a network capacity, a communication speed, and a bandwidth of the network 3) and/or performance of at least one of the multi function device 1 and the PC 2 (such as a processing capability). The degree of traffic on the network 3 can be measured by comparing the number of packets and/or a data amount measured in the network 3 for the given time period with the reference value.

As another example of the third processing for measuring the number of users N, the degree of traffic on the network 3 may be determined by measuring a time interval between a packet and the following packet. That is, when the network 3 is congested (i.e., the network traffic is high), packet communication is incessantly performed, which shortens the time interval. When the network 3 is light (i.e., the network traffic is low), the number of times of packet communication on the network 3 is less, which lengthen the time interval. The number of users N can be determined based on the time interval, for example, by using a table showing a correlation between the time interval and the number of users N. The table may be stored, for example, in a storage unit such as the HDD 14 of the multi function device 1.

The processing for enabling or disabling the function restriction to which the third processing for measuring the number of users N is applied may be executed periodically at certain intervals, or may be executed every time the multi function device 1 is started up. Further, a command to perform the processing for enabling or disabling the function restriction may be issued by the user from one of the PCs 2 or the multi function device 1, or may be issued by the administrator only.

<Modifications>

The present invention is not limited to the above-described exemplary embodiment.

Hereinafter, modifications of the present invention will be described.

(1) In the above-described exemplary embodiment, the number of users N is measured at S101 in FIG. 3, and the processing for enabling or disabling the function restriction is executed. However, the number of PCs 2 active may be simply measured instead of measuring the number of users N.

That is, the first processing for measuring the number of users N described with reference to FIG. 4 and the second processing for measuring the number of users N described with reference to FIG. 8 may be modified to first processing for measuring the number of PCs 2 active and second processing for measuring the number of PCs 2 active, respectively. As a result, if the number of PCs 2 active (in operation) is less than a threshold number, the function restriction is enabled. The first processing for measuring the number of PCs 2 active and the second processing for measuring the number of PCs 2 active can be achieved by measuring the number of active PCs based on the PCIDs instead of the user IDs.

The basis for enabling the function restriction is not limited to the number of PCs 2 active, and the function restriction may be enabled by detecting active states of the PCs 2. Examples of the active states of the PCs 2 include the number of active screen-savers of the PCs 2 and the number of switching to the standby mode of the PCs 2. In the second processing, the action of the PC 2 indicated in the event information is not limited to the logon or logoff of the PC 2, and may be turning ON or OFF of the screensaver or may be turning ON or OFF of the standby mode. The PC 2 transmits event information to the multi function device 1 in response to the action.

The number of users N shown in the above-described exemplary embodiment, the number of PCs 2 active, the number of active screen-savers of the PCs 2, and the number of switching to the standby mode of the PCs 2 described above are active states of the exemplary embodiment to be detected by the detecting unit. Especially, measuring the number of PCs 2 in operation is an example of an operation of a second execution unit.

(2) The first to third processing for measuring the number of users N may be switched by the administrator.

(3) In the above-described exemplary embodiment, at the third processing, the degree of traffic on the network 3 is measured and then the number of users is determined based on the measured degree. Thereafter, the function restriction is enabled/disabled based on the users. However, the enabling/disabling the function restriction may be determination based on the measured degree of traffic on the network 3, without determining the number of users. In this case, if the degree of traffic on the network 3 is a threshold degree or greater, the function restriction is disabled, and if the degree of traffic on the network 3 is less than the threshold degree, the function restriction is enabled.

(4) In the above-described exemplary embodiment, the storage unit of the PC 2 includes the ROM 12, the RAM 13, and the HDD 14. However, the storage unit is not limited thereto. The storage unit may be other storage unit such as a Non Volatile Random Access Memory (NVRAM).

(5) In the above-described exemplary embodiment, the multi function device 1 is described as an example of a device. However, the device of the present invention is not limited to the multi function device 1. A printer, a FAX machine, a copier, a scanner, etc., may be cited as an example of another device.

According to an exemplary embodiment of the invention, a device is connectable to a plurality of host computers. The device includes a detecting unit configured to detect an operational state of each of the plurality of host computers, and a restricting unit configured to put restrictions on a function of the device based on a detected result of the detecting unit.

Accordingly, the function of the device can be restricted based on an operational state of each of the plurality of host computers.

The detecting unit may include a first extraction unit configured to extract a number of pieces of user information with which the plurality of host computers are provided, and the restricting unit puts restrictions on the function of the device based on the number of pieces of the user information extracted by the first extraction unit.

Accordingly, even when one user uses the plurality of host computers, the number of users can be accurately detected.

The detecting unit may include a second extraction unit configured to extract a number of the plurality of host computers which are in an operational state, and the restricting unit puts restrictions on the function of the device based on the number of the plurality of host computers in an operational state extracted by the second extraction unit.

Since it suffices to simply extract only the number of the host computers, it is easy to detect the number.

The detecting unit may include an information detecting unit configured to detect information transmitted from the plurality of host computers, and the detecting unit detects an operational state of each of the plurality of host computers based on the information detected by the information detecting unit.

Accordingly, an operational state of each of the plurality of host computers can be accurately detected.

The detecting unit may include a determining unit configured to determine a degree of traffic on a network, and the restricting unit puts restrictions on the function of the device based on the degree of traffic determined by the determining unit.

Accordingly, it is easy to extract the number of pieces of the user information by determining the degree of traffic on the network.

Although the invention has been described above in relation to exemplary embodiments thereof, it will be understood by those skilled in the art that variations and modifications can be effected in these exemplary embodiments without departing from the scope and spirit of the invention.

What is claimed is:

1. An image forming device configured to execute a function, the image forming device comprising:
    a processing unit;
    memory having machine readable instructions stored thereon that, when executed by the processing unit, cause the image forming device to provide
        a detecting unit configured to detect one or more host computers accessible from the image forming device and operational states of the respective host computers; and
        a restricting unit configured to restrict the function of the image forming device based on the operational states of the host computers detected by the detecting unit,
    wherein each of the operational states comprises user information that is used at a logon to the host computer,
    wherein the detecting unit comprises a first extraction unit configured to extract a number of users based on the user information, and
    wherein the restricting unit restricts the function of the image forming device from being executed if the number of the users extracted by the first extraction unit is less than a predetermined threshold and allows the function of the image forming device to be executed if the number of the users extracted by the first extraction unit is greater than or equal to the predetermined threshold.

2. The image forming device according to claim 1, wherein the first extraction unit extracts the number of users by measuring a number of pieces of the user information which are different from one another.

3. The image forming device according to claim 1, wherein the instructions stored on the memory, when executed by the processing unit, cause the image forming device to further provide
    a transmitting unit configured to transmit a request command; and
    a receiving unit configured to receive the operation states from the host computers in response to the request command.

4. The image forming device according to claim 3, wherein the transmitting unit transmits the request command by broadcasting.

5. The image forming device according to claim 1,
    wherein the detecting unit comprises an information detecting unit configured to detect information transmitted from the host computers, and
    wherein the detecting unit detects the operational state of the host computer based on the information detected by the information detecting unit.

6. The image forming device according to claim 5,
    wherein the information comprises event information relating to an action of the host computer, and
    wherein the detecting unit detects the operational state of the host computer based on the event information.

7. The image forming device according to claim 6, wherein the information detecting unit detects one of a logon of the host computer and a logoff of the host computer as the event information.

8. The image forming device according to claim 5, further comprising:
    a storing unit configured to store the operation states of the host computers in operation,
    wherein the detecting unit updates the operation states stored in the storing unit based on the information detected by the information detecting unit.

9. The image forming device according to claim 1, further comprising
    a network connection unit configured to connect a network to allow a communication with the host computers via the network,
    wherein the detecting unit comprises a determining unit configured to determine a degree of traffic on the network, and
    wherein the restricting unit restricts the function of the image forming device based on the degree of traffic on the network determined by the determining unit.

10. The image forming device according to claim 1, wherein, when the restricting unit is not enabled, the function of the image forming device is not restricted.

11. An image forming device configured to execute a function, the image forming device comprising:

a processing unit;
memory having machine readable instructions stored thereon that, when executed by the processing unit, cause the image forming device to provide
- a detecting unit configured to detect one or more host computers accessible from the image forming device and operational states of the respective host computers; and
- a restricting unit configured to restrict the function of the image forming device based on the operational states of the host computers detected by the detecting unit, wherein the detecting unit comprises an extraction unit configured to extract a number of host computers in operation, and wherein the restricting unit restricts the function of the image forming device from being executed if the number of host computers in operation extracted by the extraction unit is less than a predetermined threshold and allows the function of the image forming device to be executed if the number of the host computers in operation extracted by the extraction unit is greater than or equal to the predetermined threshold.

12. A non-transitory computer readable medium having a computer program stored thereon, wherein said computer program, when executed by a computer, causes the computer of an image forming device, configured to execute a function, to perform operations comprising:
- detecting one or more host computers accessible from the image forming device and operational states of the respective host computers, each of the operational states including user information that is used at a logon to the host computer; and
- restricting the function of the image forming device based on the operational states of the host computers detected by the detecting, wherein the detecting includes extracting a number of users based on the user information, and wherein the restricting includes restricting the function of the image forming device from being executed if the number of the users extracted is less than a predetermined threshold and allowing the function of the image forming device to be executed if the number of the users extracted is greater than or equal to the predetermined threshold.

* * * * *